United States Patent [19]

Bouteille et al.

[11] 4,205,700

[45] Jun. 3, 1980

[54] CONTROL CIRCUIT FOR PNEUMATIC PHASE

[75] Inventors: Daniel Bouteille, Marnes-la-Coquette; Michel Nicolas, Plaisir; David Payne, L'Etang-la-Ville; Eric Petrimauxx, Evreux, all of France

[73] Assignee: La Telemelanique Electrique, France

[21] Appl. No.: 787,661

[22] Filed: Apr. 14, 1977

[51] Int. Cl.² ............................................. G05D 16/04
[52] U.S. Cl. ............................... 137/119; 137/624.14; 137/624.18; 235/201 ME; 251/28
[58] Field of Search ...... 235/201 R, 201 ME, 201 FS; 137/624.18, 624.2, 624.14, 119; 251/28

[56] References Cited

U.S. PATENT DOCUMENTS

| 2,783,936 | 3/1957 | Kistler | 251/28 |
|---|---|---|---|
| 3,318,329 | 5/1967 | Norwood | 235/201 ME |
| 3,332,443 | 7/1967 | Mize | 137/624.14 |
| 3,543,794 | 12/1970 | Stewart | 137/624.14 |
| 3,620,127 | 11/1971 | Blaisdell | 137/624.14 |
| 3,779,069 | 12/1973 | Berthold | 137/624.14 |
| 3,797,520 | 3/1974 | Lekarski et al. | 235/201 ME |
| 3,875,959 | 4/1975 | Bouteille | 137/119 |
| 3,885,591 | 5/1975 | O'Keefe | 235/201 ME |

*Primary Examiner*—William R. Cline
*Assistant Examiner*—H. Jay Spiegel
*Attorney, Agent, or Firm*—William A. Drucker

[57] ABSTRACT

The invention provides the functional reliability of an automatic device, constituted by the association of phase cells comprising, for each phase, a pneumatic AND gate and bistable memory, which is ensured by the interposition of a threshold relay between the feedback interrupter associated with a phase all and the control input of the memory.

3 Claims, 10 Drawing Figures

CONTROL CIRCUIT FOR PNEUMATIC PHASE

The present invention relates to a control circuit for an automatic pneumatic device formed by the association in series of a plurality of phase cells, each comprising on the one hand a memory with one output, supplied by a supply pressure and presenting two states stabilised by magnetic means where the logic "1" state is obtained by application on the control input of a control pressure, and on the other hand a pneumatic AND gate of which the first input receives the output pressure of the memory, the second input of which receives the discharge or feedback pressure furnished by an interrupter when this latter is actuated at the end of the operation controlled by the cell, and of which the output supplies the input of the memory of the following cell.

Such cells which are particularly adapted to the sequential control of processes by pneumatic means are known by French patent application No. 7,130,746 filed on Aug. 18, 1971 in the name of Daniel Bouteille, entitled "Pneumatic memory relay with magnetic synchronization", and make use of a memory with magnetic synchronization of the type described therein.

When a chain of a pneumatic automatic device is controlled with the aid of phase cells which have just been mentioned, it must be ensured that certain signals have effectively disappeared when they occur at logic levels which deliver advance and/or output signals.

The appearance of functional defects in the end-of-stroke relays, from which it may result that the pressure is maintained, or even the decompression time necessary for the blowing off or purge of a long conduit, in particular when the exhausts must be canalized for reasons of health, may in fact maintain in certain cases of use of the phase cells, such as that of shift registers, a sufficient pressure level to provoke the non-controlled triggering of associated adjacent cells.

It is an object of the invention to provide a control circuit adapted to improve the operational reliability of phase cells in order that the output signals (i.e. the signals of advance towards the adjacent cells and/or the signals for actuating the apparatus) be delivered only when the main conditions of secure operation are combined.

Moreoever, the invention has for its object not only to provide a control circuit for an automatic device using phase cells which, whilst benefitting from the advantages obtained previously, is also capable of complying with the imperatives of security and rapid replacement of the elements most exposed to movements, such as the bistable memory, but also to furnish an auxiliary pneumatic module capable of adapting itself to or simply associating with the existing phase cells if the logic circuit which uses them risks producing a poor functioning.

According to the invention, the proposed result is attained due to the fact that, in the fluid circulation chain comprising the AND gate and included between a first pneumatic discharge interrupter and the control input of the memory receiving the pressure of said AND gate, there is disposed a pneumatic threshold relay of which the output is directed towards the control input of said memory, of which the supply input receives the fluid coming from the discharge interrupter and of which the control input, connected to the second discharge interrupter associated with the next succeeding AND gate, enables said relay to be placed in the pass state only when the pressure that it receives is definitely lower than the control threshold of the memory.

The invention will be more readily understood on reading the following description with reference to the accompanying drawings, in which.

Figure 5:
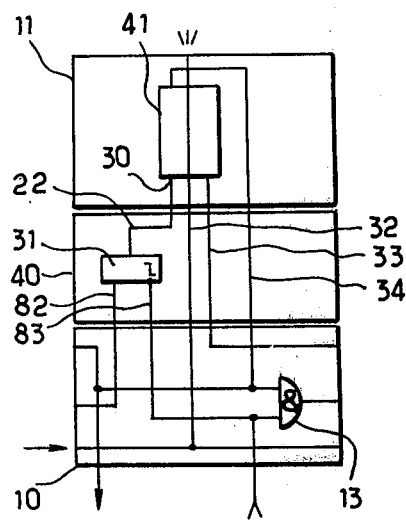
Figure 6:
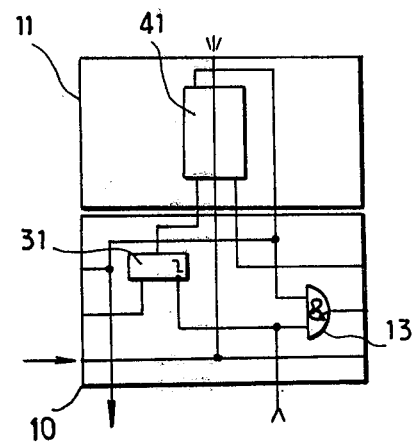

FIGS. 5 and 6 schematically illustrate an example of grouping the logic elements in removable units associable with each phase cell when the first circuit is used.

Figure 7:
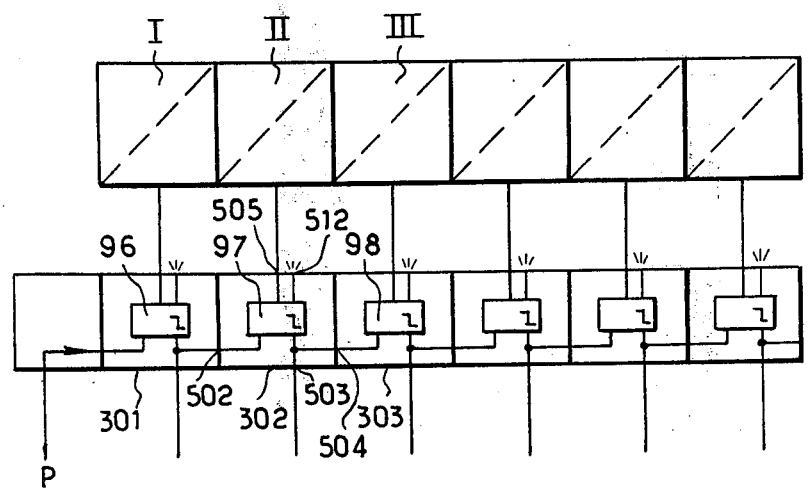

FIG. 7 schematically illustrates an example of grouping the logic elements in different modules associable together when the second circuit is used.

Figure 8:
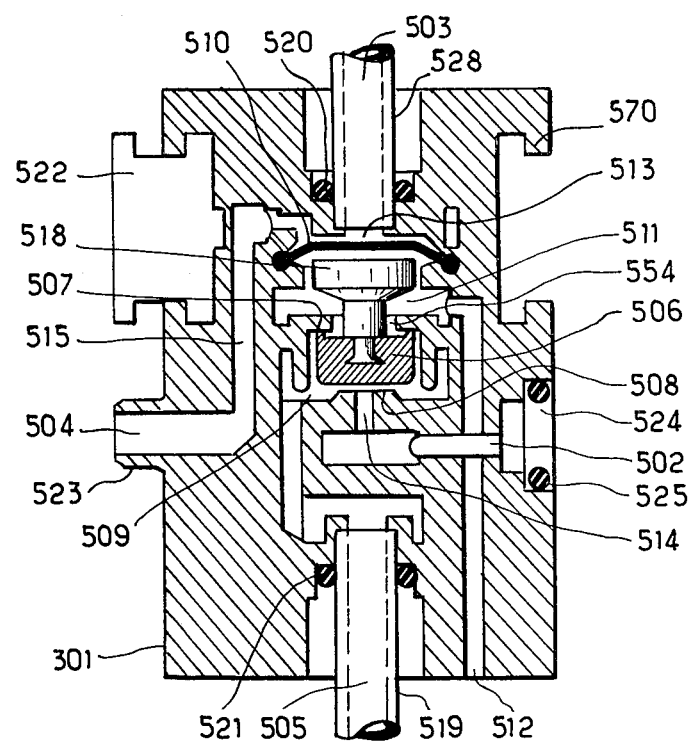
Figure 9:
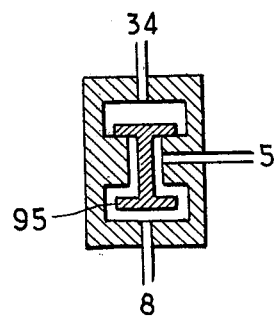
Figure 10:
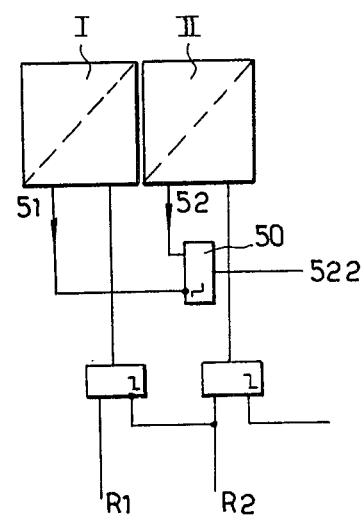

FIG. 8 shows an industrial embodiment of a module adapted to be used for the execution of the second circuit;

FIG. 9 shows the known constitution of an AND gate such as the one used in the phase cell;

FIG. 10 illustrates an improved safety circuit using a supplementary threshold relay.

Figure 1:
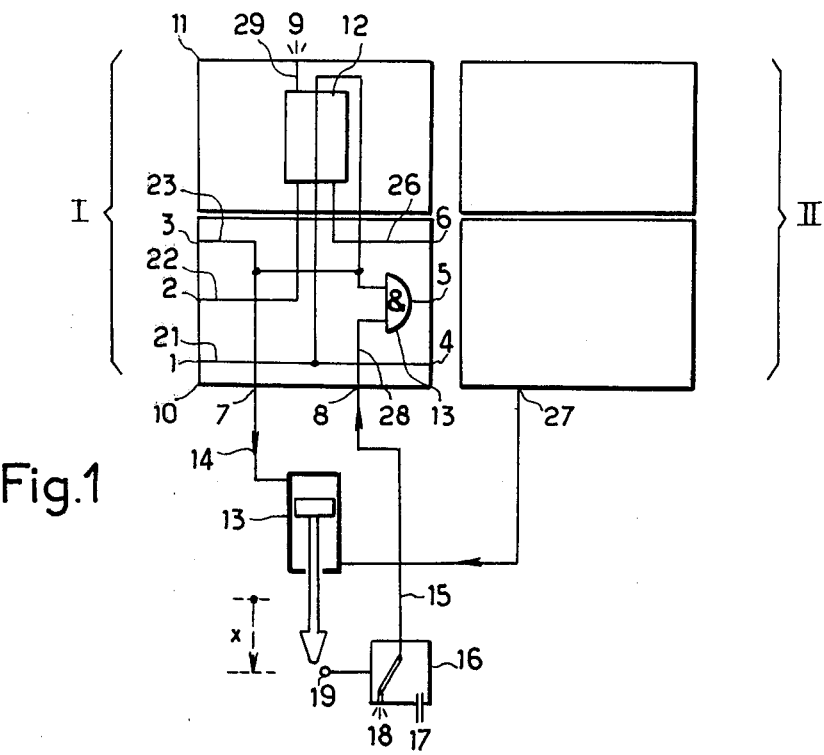
FIG. 1 illustrates a portion of sequencer using phase cells according to the prior art and applied to a simple user circuit.

Referring now to the drawings, FIG. 1 shows a pneumatic logic module in accordance with the prior art, I and II referring to two of the cells constituting a series of identical phase cells mounted in series and having to control sequential movements. Each cell is constituted by a base 10 associated with a removable element 11. In the base are arranged:

the conduit 21 serving to bring the supply pressure to the bistable memory 12 and to the next succeeding module and of which the opposite orifices are referenced 1 and 4;

the conduit 22 of which the orifice 2 terminates at one of the inputs of the memory which is of the type having magnetic synchronisation means;

the conduit 23 connected to the active output of the memory, to the orifice 3 directed towards the next preceding module, to the output orifice 7 towards the apparatus to be controlled and to one of the two inputs of a pneumatic logic AND gate 13;

the conduit 26 terminating at the second input of the memory and supplied by the orifice 6 when the pressure arrives from the next succeeding cell;

the conduit 28 terminating at the second input of the AND gate 13 and connected to the orifice 8 which will receive a feedback pressure signal signifying the completion of a movement; and finally the conduit connecting the output of the AND gate to the orifice 5 for communicating a pressure signal triggering the passage to the following phase controlled by module II.

The user apparatus is for example a ram 13 connected by conduit 14 to the output orifice 7, whose piston will cover a distance x, at the end of which it will actuate the push rod 19 of an end-of-stroke interrupter 16, the active conduit 15 of which, connected at rest to the exhaust 18, will come in communication with a source of pressure 17 which may be the same as that which supplies conduit 21.

In such a device, the order arriving at the orifice 2 provokes the triggering of memory 12, the output of which transmits the pressure to the conduit 23, to the conduit 14 and to the input of the AND gate 13, which will furnish an order on orifice 5 only when the discharge pressure will be applied to the conduits 15 and 28, which are normally connected to exhaust 18 via the end-of-stroke interrupter 16.

However, if, during a previous cycle, the end-of-stroke interrupter 16 has remained on the position connecting the conduits 15 and the supply pressure 17, the appearance of the output signal of the memory will immediately provoke a passage to the following phase, since the AND gate 13 will immediately be in its pass state.

The same situation may present itself if two successive rapid actuations of the ram are provoked and if, the interrupter 16 having functioned normally, the conduit 15 is still subjected to a residual pressure provoked by a defective purge caused, for example, by the fact that the exhaust is canalized.

Figure 2:
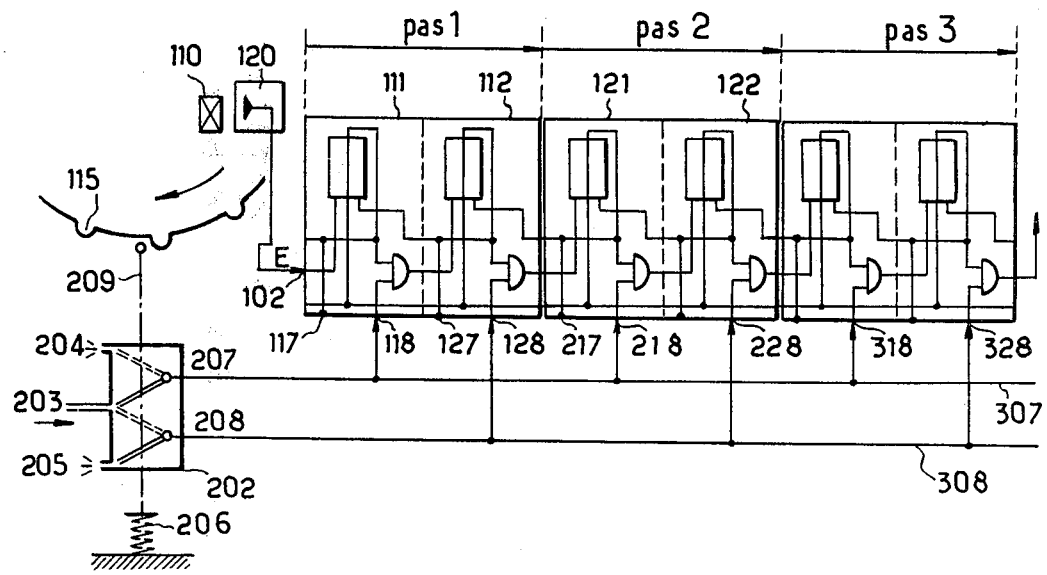
FIG. 2 shows an application of the phase cells for making a shift register.

Another circuit which may provoke the appearance of comparable defects is that of FIG. 2, where two modules 111-112, 121-122, etc. . . are associated in pairs, each forming one of the stages 1, 2, 3 of a shift register intended to memorise the position of a piece 110 carried for example by a rotary plate 101.

The state and the position of the piece 110 must for example be memorised for an operation to be carried out thereon when the plate will have pivoted through a certain angle.

The state of the piece 110 is recorded by the detector 120 connected to the input 102 of the module 111, whilst the advance of its position is located with the aid of the distributor 202 actuated periodically by the push rod 209 which is displaced by cams 115 of the plate.

The distributor comprises two outputs 207, 208 which are alternately connected to the pressure orifice 203 and to the exhausts 204 and 205, a return spring 206 determining the rest position.

The conduit 307 is connected to inputs 118, 218, 318 of each of the first modules of each stage, namely the odd row modules, whist the conduit 308 is connected to the inputs 128, 228, 328 of each of the second modules of each stages, namely the even row modules, these inputs corresponding respectively to the orifices 7 and 8 of the module illustrated in FIG. 1. The orifices 117, 127, 217, etc. . . are obturated.

This circuit functions as follows:

A piece 110 having presented a certain state upon its passage in front of detector 120, an input pressure E is applied to the orifice 102 and is immediately transmitted through module 111 to module 112 by reason of the existence of a permanent pressure in the conduit 307.

When one of the cams 115 actuates the distributor 202, the pressure in the conduit 307 will disappear, and appear in conduit 308.

The module 112 will generate an output signal which will trigger the module 121, until, the cam 115 having returned the distributor into its original position, the pressure in the conduit 307 will provoke an output signal of the module 121 in turn triggering module 122.

The change of state of the successive modules will accompany the step-by-step movement of the piece 110.

The hypothesis according to which a determined module conserves its state rests, however, on the supposition that, if the pressure exists in one of the conduits 307 or 308, the other conduit 308 or 307 is totally purged. As, by reason on the one hand of the length of the conduits in question and on the other hand of the rapid switchings of the distributor, this theoretical situation is not always observed, there may be non-controlled changes of state of the shift register.

Figure 3:
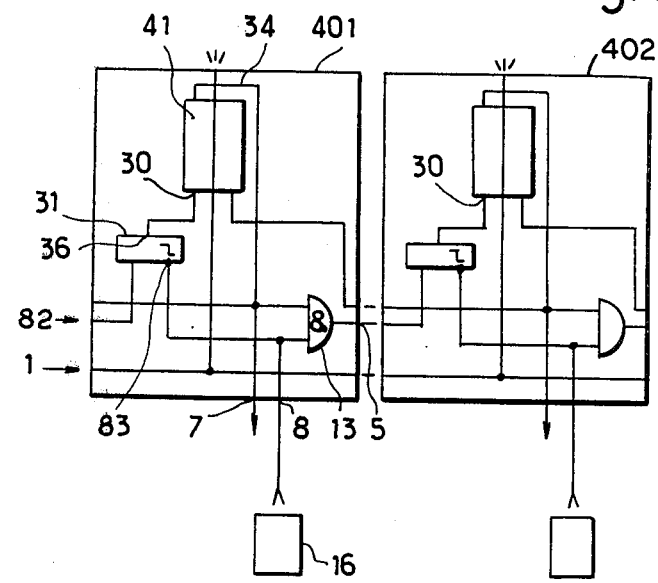
FIG. 3 shows a first circuit according to the invention.

FIG. 3 schematically shows the association of phase cells in which, between the input orifice 82 and the corresponding input 30 of the bistable memory 41, there is disposed a pneumatic threshold relay 31 having a function of inhibition.

This relay possesses an output 36 connected to said input 30 of the memory, a supply input connected to the orifice 82, and a control input 83 connected to the discharge signal orifice 8.

The structure of this relay is such that an output signal is delivered only when the supply pressure is present and the discharge signal pressure has reached or is located at a pre-determined low pressure threshold, for example close to 1/12th of the supply pressure of the cells which is the same as that of the memories and in all cases definitely lower that the control pressure necessary for triggering the memory into logic state "1". This pressure will be termed de-control pressure.

The functioning of the cell according to FIG. 3 is as follows:

When the pressure on orifice 8 of the phase cell 401 is lower than the de-control pressure, the threshold relay transmits to its output 36 a pressure signal applied to the orifice 82; consequently, the memory 41 is triggered into its logic "1" state for which its output 34 communicates on the one hand a control pressure towards the users device via orifice 7 and on the other hand this same pressure towards the first input of the AND gate 13; when a feedback or discharge pressure signal is applied at the orifice 8 of the AND gate 13, the latter is triggered into a pass state and communicates an advance signal on the orifice 5 going to the next succeeding cell 402, the constitution of which is identical to that of cell 401.

If, however, a high pressure, or even a residual pressure higher than the de-control threshold of the threshold relay 31 still exists on orifice 8, the relay 31 cannot be triggered into the pass state and, consequently, the memory not being triggered into logic state "1", no output signal will be delivered to the orifice 7, 5 respectively, until the residual pressure has decreased and is again lower than the de-control threshold.

In the embodiment of FIG. 5, the inhibition threshold relay 31 is disposed in a casing 40 placed between the base 10 and the removable memory 11, said casing moreover presenting conduits 32, 33, 34, 82 and 83, which enable the supply of fluid as well as the connections for the reset and output signals to the memory.

The disclosed assembly is particularly advantageous when the memory is of the type with magnetic synchronization.

In fact, a bistable memory of the type used in the circuit according to the invention must be able to function between limts of supply pressure varying from 3 to 8 bars, from which it results that the pressure necessary for control will vary by about 0.2 bars, whilst the de-control pressure of a threshold relay will also vary by about 0.1 bar in the reverse direction when the supply pressure varies from 3 to 8 bars.

If it is desired that these pressure variations do not result in a functional defect when the memory and the gate are associated, a memory must be chosen whose control pressure, i.e. the pressure necessary for triggering it into logic state "1", is fairly high and relatively constant; the bistable memories with magnetic synchronization present a high control pressure varying only from 1.3 to 1.5 bars when the supply pressure varies from 3 to 8 bars, and are consequently particularly well adapted to be used in the disclosed modules enabling threshold relays of low pressure to be used, the relay pressure being for example equal to one twelfth of the supply pressure of the memory, the de-control threshold varying from 0.3 to 0.4 bars for the same variation of the supply pressure.

The function of inhibition carried out by the threshold relay could have been performed by other means such as an OR gate inserted between the reset conduit and the reset input of the memory; however, these solutions involve either difficulties of adaptation of the phase cell to the different functions, or difficulties in the manufacture of the gates.

In the embodiment according to FIG. 6, the inhibition threshold relay is included in the base 10, this being possible taking into account its robust structure due to which it practically does not require any replacement due to wear and tear.

Apart from the defective situation where an end-of-stroke interrupter communicates solely a permanent or residual pressure whose existence may provoke a precocious advance of the movements associated with the phase cell following the one which is connected to said end-of-stroke interrupter, operational defects may also be met with, resulting from the slow or delayed disappearance of the output pressure of the memory, combined with the maintenance of an accidental or residual pressure by the end-of-stroke.

This latter situation may also result in a precocious start of the movements controlled by the phase cell which follows the one where the defect appeared.

Figure 4:
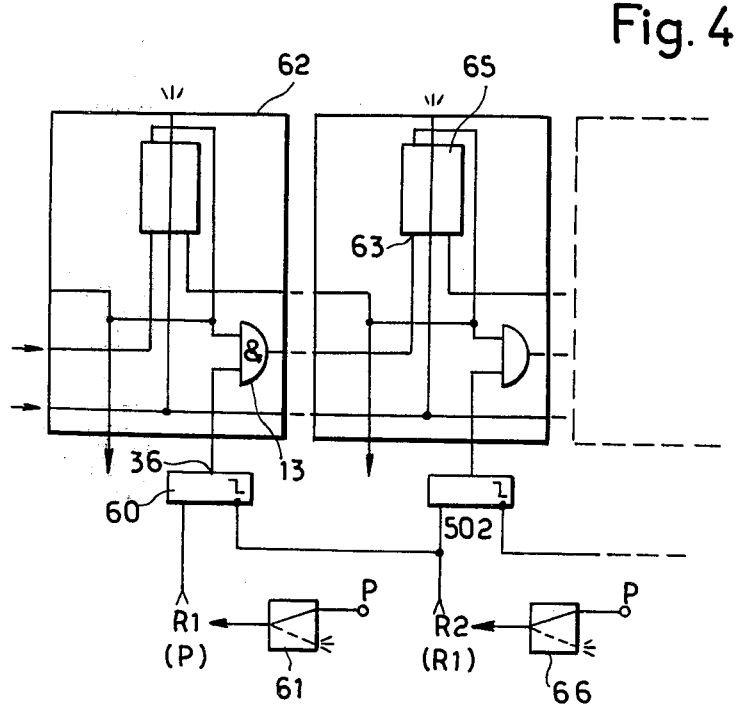
FIG. 4 shows a second circuit according to the invention.

Another arrangement avoiding the drawbacks due to the maintenance of an abnormal pressure on the output conduit of the pneumatic end-of-stroke interrupter, is the one shown in the schematic circuit of FIG. 4.

A threshold relay 60 is also used in this case, which is placed in the transmission circuit of the pneumatic signal leaving from the end-of-stroke unit 61 associated with the phase cell 62 and terminating at the input 63 for triggering the memory 65 of the following cell into logic state "1".

A comparison of FIGS. 3 and 4 will further show that when the cells are mounted in series, the check of the input of the memory 65 of a cell of a given row is made by taking into account not only the logic state of the signals coming from the end-of-stroke unit 61 of the preceding row, but also the level of the signal coming from the end-of-stroke unit of the same row.

In FIG. 4, the AND gate 13 is triggered into its pass state for triggering the memory 65 into logic state "1", only if the pressure R1 coming from the end-of-stroke interrupter 61 is applied to the relay 60 and if the pressure R2 coming from the interrupter 66 is lower than or equal to the de-control threshold of the relay 60.

If it is desired also to check the state of the end-of-stroke 61, a supplementary phase cell may be used before the phase cell 62, which will have to be supplied by a threshold relay receiving on its supply input the permanent supply pressure P and on its second input (control input) the output signal of the pneumatic interrupter 61. This assembly is illustrated in the same Figure by references P and R1 in brackets.

In the two embodiments of FIGS. 3 and 4, it is also to be noted that the threshold relay 31, 60, is directed towards and supplies with fluid the input which triggers the memory into logic state "1", because the output signal on 34 of the memory 41 occuring earlier than the signal coming from the orifice 8, the AND gate 13, whose structure and state correspond to those illustrated in FIG. 9, has connected the input 34 and the output 5 together by displacement of the double valve 95, before the discharge pressure arrives in conduit 8. The structure of such an AND gate is furthermore known per se.

In the mode of connection as shown in FIG. 4, the output of the relay 60 outside the phase cell 62 is connected to the discharge input of the latter, whilst the supply input is connected to the corresponding end-of-stroke unit R1 and the second input (control input with low de-control threshold) is connected to the end-of-stroke unit R2 associated with the following cell.

When, for reasons of safety, it is desired that such a threshold relay 96, 97, 98 be associated with each phase cell I, II, III, . . . of an automatic control chain, the assembly shown in FIG. 7 is obtained. FIG. 7 indicates at the same time the path of the conduits inside the casing of modular element 301, 302, 303 . . . This path has been chosen to avoid superfluous connections between channels and to allow at the same time the association in series of the modular elements in question, the chain of which is placed parallel to the chain of the phase cells.

A practical embodiment of such a modular element is shown in FIG. 8 where 301 represents a body provided with orifices 502, 503, 504 and 505, corresponding to those of the preceding Figure, and where consequently 503 is the orifice connected to the end-of-stroke associated with the corresponding phase cell; 503 is the orifice connected to the end-of-stroke unit associated with the following phase cell; 505 is the orifice connected to the discharge orifice of the first of these cells, and 504 is the orifice connecting the orifice 503 of the element with the orifice 502 of the following element.

The internal cavity of the body lodges a valve 506 movable between two seats 507 and 508 in a first chamber 509 connected to the orifice 505. A deformable membrane 510 is placed between a second chamber 511 terminating at orifice 504 of the first seat 507 and connected to the exhaust 512 on the one hand and a third chamber 513 connected to the orifices 503 and 504 on the other hand, whilst a conduit connects the orifice 502 to a calibrated opening 514 which is that of the seat 508. The membrane 520 is sufficiently flexible to actuate the push rod 518 fast with the valve 506 in the direction closing the seat 508 when the pressure appears at 503. In FIG. 8, the conduit 515 connected to the orifice 504 and the chamber 513 are in permanent connection since no action tends to place the membrane against these two orifices, the disposition of which is solely explained by a saving of space necessitated by the penetration of the flexible tube 528 up to the vicinity of the membrane.

The flexible tube 528 as well as the flexible tube 519 are held in place by annular clamps (not shown) whose gripping members hold their periphery, whilst the sealing is performed by O-rings 520, 521.

When the elements such as 301 of FIG. 8 are assembled together to form a chain (301, 302, 303 of FIG. 7), a mobile slide valve 522 ensures the mechanical connection with the adjacent gripping members 570, whilst the pneumatic connection with the adjacent elements is effected by the lug 523 concentric with respect to the orifice 504 placed in a recess 524 concentric with respect to the orifice 502 and provided with a seal 525.

The functioning of this threshold relay is as follows;

When a high pressure representing the signal on the supply input 502 of the relay is applied, this pressure is transmitted to the output 505 only if a zero or sufficiently low pressure is applied to the orifice 503 for the force communicated to the membrane 510 not to push the valve 506 against the seat 508; this force depends in particular on the proportions between the diameter of the seat 507 and that of the membrane 510 as well as on the ratio of the pressures prevailing at 503 and 502.

As soon as the pressure at orifice 503 reaches a certain value, the valve takes a low position and the output 505 no longer receives pressure; when the pressure at 503 reduces, the valve will lift only for a very low value determined by the ratio of the diameter of the opening 514 to that of the membrane 510, which value is called de-control value.

A threshold relay 50 such as the one shown, associated with the base of a phase cell II of FIG. 10 and having the same properties as that which is described hereinabove, makes it possible to complete the previously described safety measures, avoiding the transmission of an output signal S2 appearing on the phase cell II, as long as the output signal of the phase cell I is present; the output S22 of the relay is then connected to the control apparatus having to benefit from this supplementary safety measure.

What is claimed is:

1. A pneumatic circuit for the automatic control of a sequence of programmed operations, said pneumatic circuit comprising: a plurality of cascade-mounted control cells, each of said cells controlling a programmed operation of the sequence and comprising: a bistable pneumatic memory having a set input receiving a triggering pressure signal which triggers the said memory when the pressure of said triggering signal exceeds a predetermined level, and an output, an AND gate pneumatic logic means having first and second inputs and an output; means providing a feedback signal upon completion of the programmed-operation controlled by each cell; the first input of said AND gate being connected to the output of the memory of the respective cell, and fluid transfer means connecting the means for providing a feedback signal upon completion of the programmed operation controlled by the preceeding cell to the set input of the memory through the AND gate of the preceeding cell, said fluid transfer means comprising a first portion connecting the said means for providing a feedback signal upon completion of the programmed operation controlled by the preceeding cell to the second input of the AND gate of the preceeding cell and a second portion connecting the output of the AND gate of the preceeding cell to the set input of the memory, said fluid transfer means including a threshold relay having a supply pressure input, a control input and an output, the said threshold relay being serially connected in the fluid path of said fluid transfer means from its supply pressure input to its output between the AND gate of the preceeding cell and the set input of the memory, the control input of said threshold relay being connected to the means providing a feedback signal upon completion of the programmed operation controlled by the respective cell, the threshold relay transferring the pressure from its supply pressure input to its output when the pressure level on its control input is lower than a threshold level which is in turn substantially lower than the said predetermined pressure level.

2. A pneumatic circuit as claimed in claim 1, wherein the said threshold relay is part of the said first portion.

3. A pneumatic circuit as claimed in claim 1, wherein the said threshold relay is part of the said second portion.

* * * * *